(12) United States Patent
Callanan

(10) Patent No.: US 9,207,841 B2
(45) Date of Patent: Dec. 8, 2015

(54) ONLINE VIDEO DISTRIBUTION

(71) Applicant: WireWax Limited, London (GB)

(72) Inventor: Steven James Callanan, London (GB)

(73) Assignee: WireWax Limited, London (GB)

( * ) Notice: Subject to any disclaimer, the term of this patent is extended or adjusted under 35 U.S.C. 154(b) by 222 days.

(21) Appl. No.: 13/950,472

(22) Filed: Jul. 25, 2013

(65) Prior Publication Data

US 2014/0033038 A1    Jan. 30, 2014

(30) Foreign Application Priority Data

Jul. 25, 2012    (GB) .................................. 1213217.1

(51) Int. Cl.
| | |
|---|---|
| *G06F 3/0484* | (2013.01) |
| *H04N 21/472* | (2011.01) |
| *H04N 21/4725* | (2011.01) |
| *H04N 21/845* | (2011.01) |
| *H04N 21/858* | (2011.01) |

(52) U.S. Cl.
CPC .......... *G06F 3/0484* (2013.01); *H04N 21/4725* (2013.01); *H04N 21/47217* (2013.01); *H04N 21/8455* (2013.01); *H04N 21/858* (2013.01)

(58) Field of Classification Search
CPC .......... H04N 21/47217; H04N 21/482; H04N 21/485; G06F 3/16
See application file for complete search history.

(56) References Cited

U.S. PATENT DOCUMENTS

| | | | |
|---|---|---|---|
| 7,207,006 B1 | 4/2007 | Chen et al. | ..................... 715/723 |
| 7,908,556 B2 * | 3/2011 | Shamma et al. | .............. 715/719 |
| 8,826,117 B1 * | 9/2014 | Junee et al. | .................... 715/230 |
| 2008/0201734 A1 | 8/2008 | Lyon | |
| 2008/0285940 A1 | 11/2008 | Kulas | |
| 2009/0007023 A1 | 1/2009 | Sundstrom | |
| 2009/0299725 A1 * | 12/2009 | Grigsby et al. | .................... 704/2 |
| 2011/0052144 A1 | 3/2011 | Abbas | |
| 2011/0093888 A1 | 4/2011 | Araki | |
| 2011/0276921 A1 * | 11/2011 | Long | ............................. 715/825 |
| 2012/0203651 A1 * | 8/2012 | Leggatt | ........................ 705/26.3 |
| 2012/0206647 A1 * | 8/2012 | Allsbrook et al. | ............ 348/461 |
| 2012/0308206 A1 * | 12/2012 | Kulas | ............................ 386/244 |
| 2012/0323891 A1 * | 12/2012 | Jacobson et al. | .............. 707/722 |
| 2013/0290847 A1 * | 10/2013 | Hooven | ........................ 715/719 |
| 2014/0179440 A1 * | 6/2014 | Perry | ............................. 463/42 |

FOREIGN PATENT DOCUMENTS

| | | |
|---|---|---|
| EP | 1 684 517 | 7/2006 |
| WO | WO 01/20466 | 3/2001 |

OTHER PUBLICATIONS

Extended European Search Report, dated Jan. 8, 2014, 7 pages.
UK Search Report, dated Nov. 28, 2012, 1 page.

* cited by examiner

*Primary Examiner* — Rashawn Tillery

(74) *Attorney, Agent, or Firm* — Sunstein Kann Murphy & Timbers LLP

(57) ABSTRACT

A video player for tagged online video includes a means for receiving a stream of video data and tag data. The tag data includes tag details including for each tag a link to display during video playback and a location at which to display the link. A video display output displays the video data, a user-selectable tag display GUI option, and selectively, the tag data. The video player is adapted to detect a selection of one of at least a first and a second option via the user-selectable tag display GUI option.

10 Claims, 3 Drawing Sheets

ONLINE VIDEO DISTRIBUTION

This application claims priority from GB Patent Application 1213217.1, filed Jul. 25, 2012, which is incorporated herein by reference

FIELD OF THE INVENTION

The present invention relates to online video distribution.

BACKGROUND ART

Online video is now an established communication tool, being used for social purposes and for commercial marketing and other purposes. Indeed, the success of online video is such that content-enabled video services are being developed, allowing functionality to be co-delivered with the video such as clickable hyperlinks within the video frame, such as external links that lead the viewer to a specific website or other internet address, or popouts to display text or images, or play video or audio alongside or instead of the video previously being played.

U.S. Pat. No. 7,620,914 discloses the incorporation of clickable hyperlinks into a viewable video, sending the hyperlink data in a separate stream alongside the video data. The two are then re-united in the video player and the hyperlinks are displayed over the video data, allowing a user to click the hyperlink as and when desired.

U.S. Pat. No. 7,817,822 discloses a motion tracking system for such hyperlinks. This allows a user to associate the hyperlink with a specific feature in a frame of the video, following which the motion tracking system detects movement of that feature in subsequent frames and adjusts the position of the hyperlink accordingly. As a result, the hyperlink appears to "float" over the feature and follow it as it moves in the video. The hyperlink can therefore be associated with the feature, such as a link offering more information on or an opportunity to purchase the item forming that feature. Multiple hyperlinks can then be safely added to a video or video segment, with the meaning of each hyperlink remaining clear to a viewer at all times.

We refer to such hyperlinks, together with any other items that may be inserted into the video to allow the user to interact with or gain further information from the video, as "tags".

SUMMARY OF THE INVENTION

Such hyperlinks are potentially very useful, but run the risk of overloading the viewer with visual stimuli when they may wish to concentrate on the underlying video. This may prompt a user to disable the display of tags, in which case the benefit of the tags is lost for that video and (potentially) for subsequent videos viewed by that user.

The present invention therefore provides a video player for tagged online video, comprising a means for receiving a stream of video data and tag data, the tag data comprising details of a plurality of tags including, for each tag, a link to display during video playback and a location at which to display the link; a video display output adapted to display; the video data, a user-selectable tag display GUI option, and selectively, the tag data; a means for receiving information as to a location of a GUI pointer relative to the displayed video output; wherein the video player is adapted to detect a selection of one of at least a first and a second option via the user-selectable tag display GUI option and, where the most recent selection is the first option, display tags during playback of the video data, where the most recent selection is the second option, display tags during playback of the video data only if a GUI pointer is proximate the tag location.

Thus, the user can choose to display tags either all the time, or just when they are actively interacting with the video. In the latter case, the user can place the GUI pointer (such as a mouse pointer or a gesture) proximate an item of interest in the video and, if a tag is available for that item, it will be displayed. The tag data can comprises a default tag display preference information which applies if no selection is made by the user. This could be used to ensure that tags are displayed (by default) in an advertising video or to suppress them in a feature film, for example. Such a default would continue until over-ridden by the user selecting a tag display option.

The location information included in the tag data typically includes information as to the time within the video data that the tag is to be displayed, and also as to the position within the video frame that the tag is to be displayed. The position may of course vary with time as the object that is tagged moves within the frame.

The video player can, if desired, display the user-selectable tag display GUI option only when GUI pointer is proximate the location of the user-selectable tag display GUI option, and suppress the option when the GUI pointer is remote therefrom or has been static for some time.

Ideally, there will be a defined criterion for the video player to decide whether the GUI pointer is proximate the tag location. One possibility is for the GUI pointer to be proximate the tag if it is less than a preset distance from a centre of the tag location. We prefer, however, for the criterion to be either that the GUI pointer lies within the tag location, or that the GUI pointer is less than a preset distance from an edge of the tag location. These latter criteria deal better with large tags and tags that are not simple symmetric shapes.

The video player can of course offer a third option via the user-selectable tag display GUI option, being that the video player simply displays no tags during playback of the video data.

Where we refer to a GUI pointer, we do of course intend to mean whatever pointing/selection device is relevant to the graphical user interface (GUI) in question. Thus, for a standard desktop PC this will usually be a mouse and associated mouse pointer. For a laptop, this may be a touchpad, trackball or pointing stick (Trackpoint™) device and associated mouse pointer. For a tablet, smartphone or other touchscreen device it will be the touchscreen itself. For a motion-sensing device, the pointer will be whatever part of the user is being employed to make a gesture. A reference to a "click" or a selection should be interpreted accordingly, to include mouse clicks, touchpad presses, touch events on touchscreens, gestures and the like.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
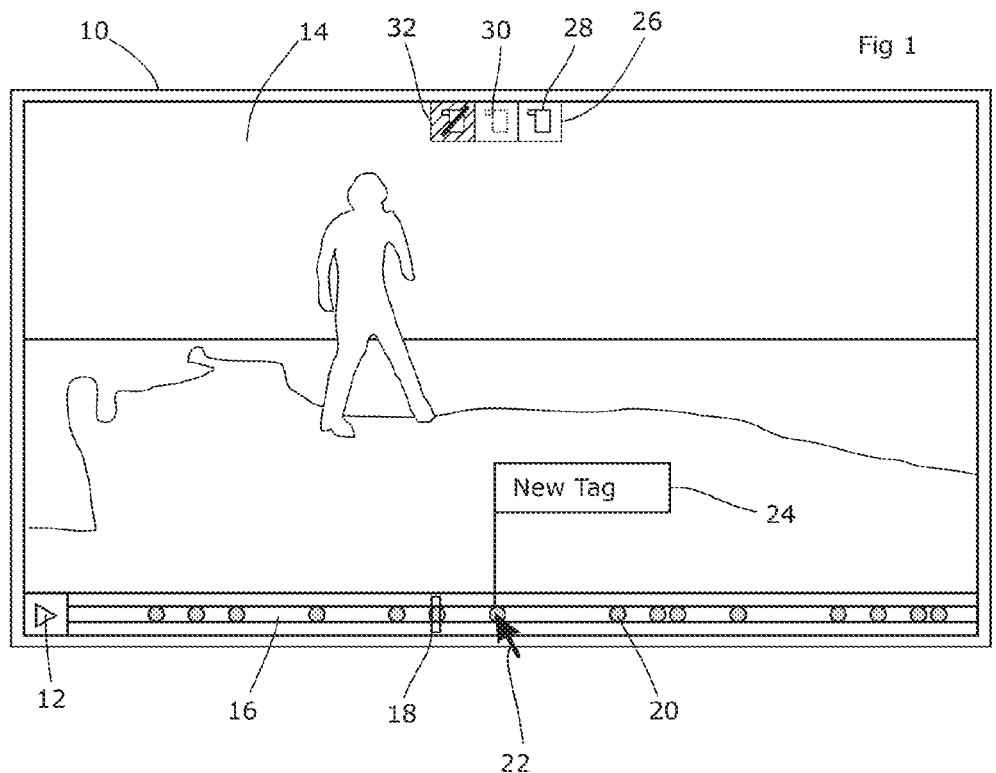
FIG. 1 shows a video player window displaying a tagged video.

Referring to FIG. 1, a window 10 comprises the visible output of a video player in the form of a software product recorded on one or more non-transitory, tangible computer readable storage media and running on a suitable processor with access to that media. The video player receives an incoming stream of video data and tag data, usually from a networked source such as the Internet, and (under the control of a user) plays the video content back by displaying it in the window 10. The user can start the playback process and pause playback by clicking a "play/pause" GUI icon 12 or by clicking in the video frame 14. A timeline 16 is provided beneath the video frame 14 to indicate the position of the current playback point within the video by means of a progress bar 18 that can, if desired, be dragged and dropped to a chosen playback point in the usual manner associated with GUI-based systems. Markers 20 are provided along the progress bar 18 to show the location along the video of tags in the video. When the user places the GUI pointer 22 over such a marker, the video player displays a link 24 showing the details of the tag.

The tag data supplied to the player along with the video data comprises details of a plurality of tags including, for each tag, a link to display during video playback and a location at which to display the link. The location information comprises both position data (within the video frame 14) and time data, i.e. the playback point at which the tag should be displayed. The position data may vary with time, such as (for example) if the tagged item shown in the video moves within the frame.

FIG. 1 also shows a tag choice GUI item 26 at the top of the video frame 14. This is displayed either continuously through the video, or whenever the GUI pointer 22 is active (i.e. while it is moving and for a preset period thereafter) or whenever the GUI pointer 22 is proximate the tag choice GUI item 26 (as defined below). It offers three options;

an "always on" option 28, indicated by an icon of a tag,
a "sometimes on" option 30, indicated by an icon of a greyed-out tag, or (as shown) a tag with a dotted outline, and
an "always off" option 32, indicated by an icon of a tag crossed out.

The "always on" option 28 and the "always off" option 32 are self-explanatory; when these options are selected, the video player either displays all of the tags, all of the time, or it displays no tags during playback, respectively. As shown in FIG. 1, the "always off" option 32 is shown with shading to indicate that it is highlighted; in an actual display this will usually be indicated by a highlight colour or a difference of intensity. Thus, no tags are shown in the video frame 14 and tags can only be accessed via the timeline 16 as described above.

Figure 2:
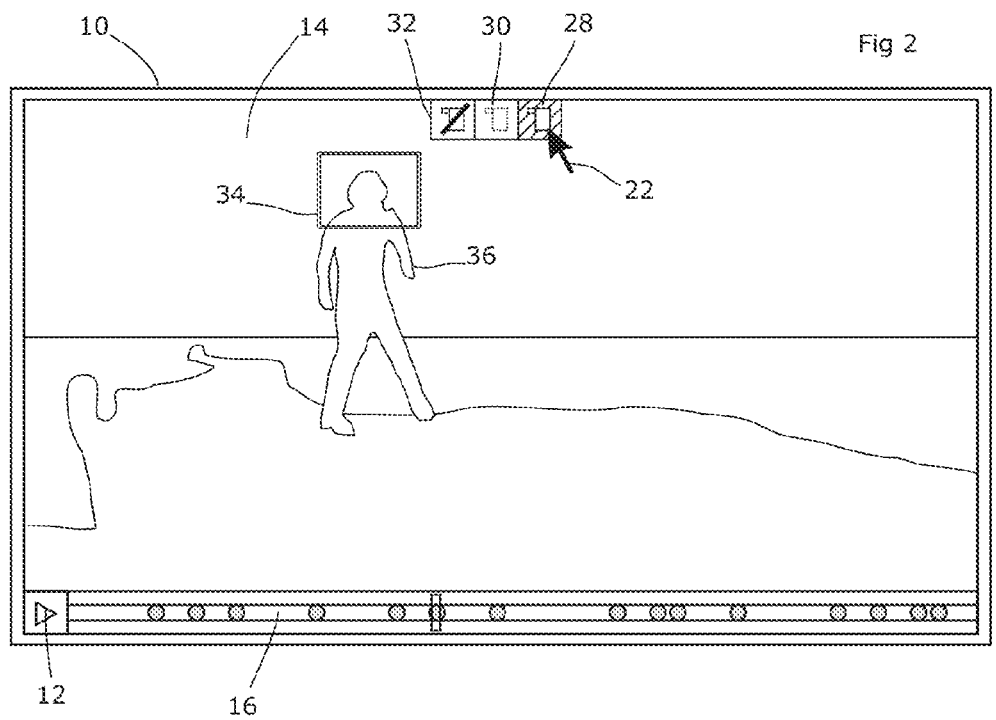
FIG. 2 shows the video player window of FIG. 1 with an active tag.

FIG. 2 shows the same video frame after the "always on" option 28 has been activated by moving the GUI pointer 22 (in this case a mouse pointer) over the icon and clicking or otherwise indicating a selection in accordance with the GUI in question. The video player responds by displaying a shape 34 over the head of the person 36 shown in the video frame 14, corresponding to the time and position information provided in the tag data for that tag. The shape can be displayed in any manner that is deemed convenient, such as an outline shape in black, another suitable colour, or a colour contrasting with the background. Alternatively, the region within the shape could be highlighted by being displayed at a greater brightness than the surrounding frame, or the like.

For the sake of simplicity, the shape is shown in FIG. 2 as a rectangle. However, the tag could be any desired shape, such as an abstract shape, a logo, text, etc without limitation.

Figure 3:
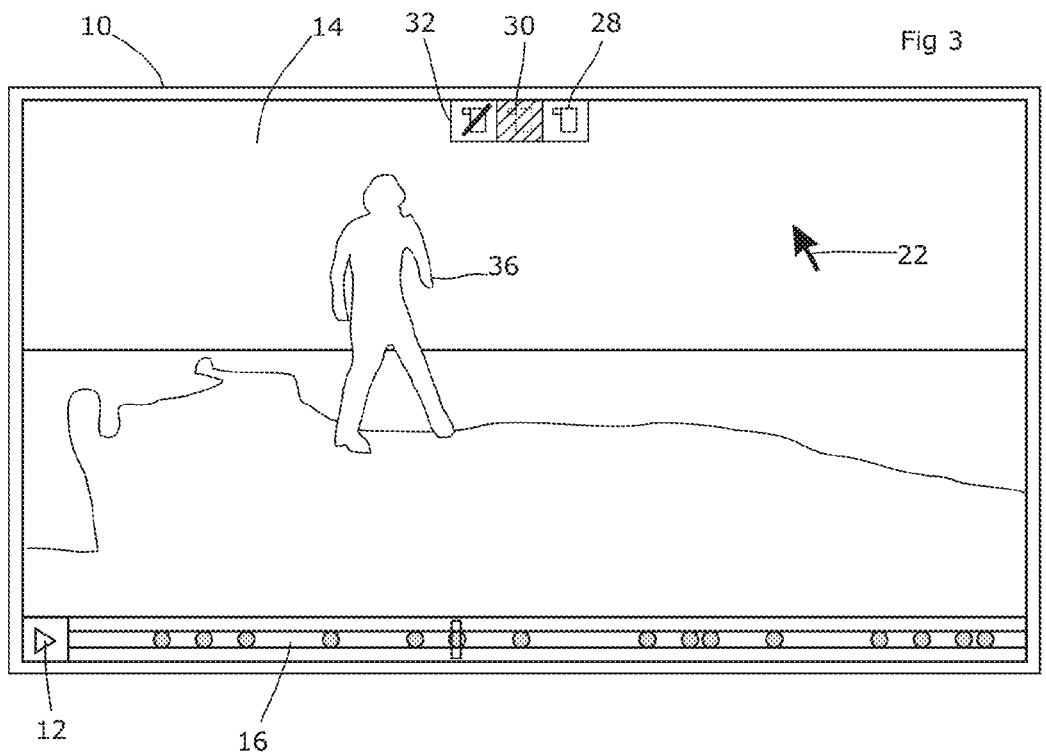
FIGS. 3 and 4 show the video player window of FIGS. 1 & 2 with tags selectively activated.
Figure 4:
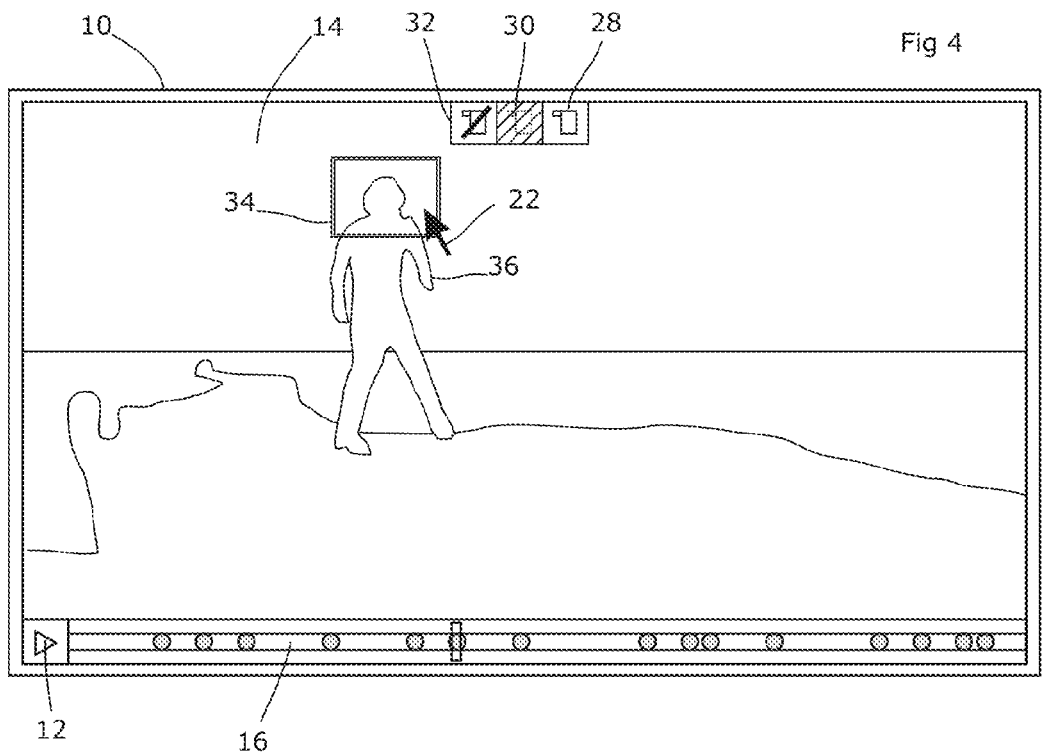

FIGS. 3 and 4 show the effect of selecting the "sometimes on" option 30. When this is activated, the video player supresses (or does not display) tags if the GUI pointer 22 is remote from the location of the tag. Thus, in FIG. 3 the mouse pointer 22 has been placed by the user in a different part of the frame 14 to that of the person 36 over whose head the tag is located. Thus, the tag is not displayed. In FIG. 4, however, the user has moved the mouse pointer 22 so that it lies over the tag location 34, and the video player therefore displays that tag (together with any others that may be proximate). If the user clicks (or otherwise selects) the tag while the mouse pointer 22 is over it, then the action associated with the tag will be carried out, such as opening a pop-out window with further information and/or actions, or activating a hyperlink to other data. This allows a user to exercise close and continuous control as to whether tags are displayed; by moving the mouse pointer or other GUI device away from the video frame entirely, they can prevent tags from being displayed and can simply watch the video content. However, if they wish to investigate an item appearing in the video more closely, they can move the mouse pointer or other GUI device over the item in question and thus cause any associated tags to be displayed.

As an alternative to completely suppressing the tag, it could be rendered in a very subtle state such as a faint opaque rectangle, such as to suggest that a tag exists but without interfering with the user's viewing of the video. Then, as the mouse or other GUI pointer approaches the tag it could be displayed properly, perhaps gradually becoming clearer with closer approach by the GUI pointer.

The display of the tag could be an abrupt change from the absence of a tag (or merely a subtle hint of a tag) to the tag being displayed. Alternatively, an animation could be triggered to allow the transition between the two states; the tag could fade in, or open out from a point or from the GUI pointer, or could unfurl or roll out to display itself, or any such animation considered to artistically preferred.

The various options do of course operate as so-called "radio buttons", indicating that the selection of one option automatically prompts the de-selection of the other options. Likewise, a default setting can either be pre-programmed into the video player, or it can be provided together with the video or the tag data supplied to the video player. The latter option allows the content creator to match the tag behaviour to the type of content, so for example) a feature film might have the "sometimes on" tag active by default whereas advertising content might have "always on" active by default. The user can of course make a selection via the video player and this will normally take precedence. Another option that is useful in practice is to allow the content creator to limit the user's options by including an enabling or disabling flag in the tag data for some or all of the tag options; thus a content creator could prevent the user from changing the default settings, or could allow them to switch between the "always on" and "sometimes on" settings but not select "always off", for example.

Figure 5:
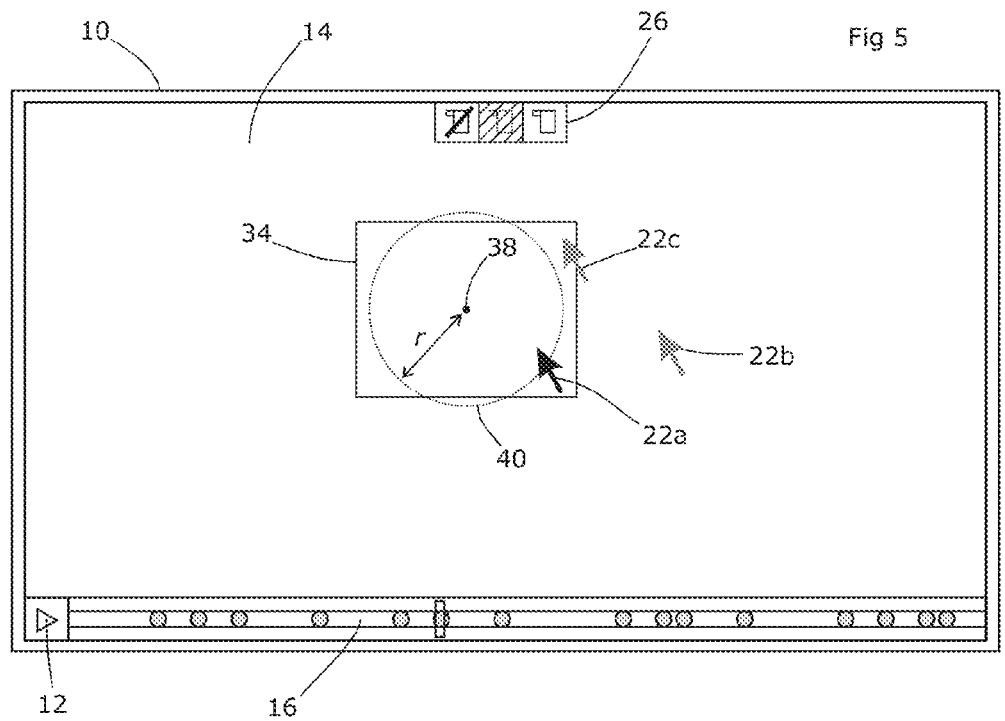
FIGS. 5 and 6 show different methods of determining proximity between a tag and a GUI pointer.
Figure 6:
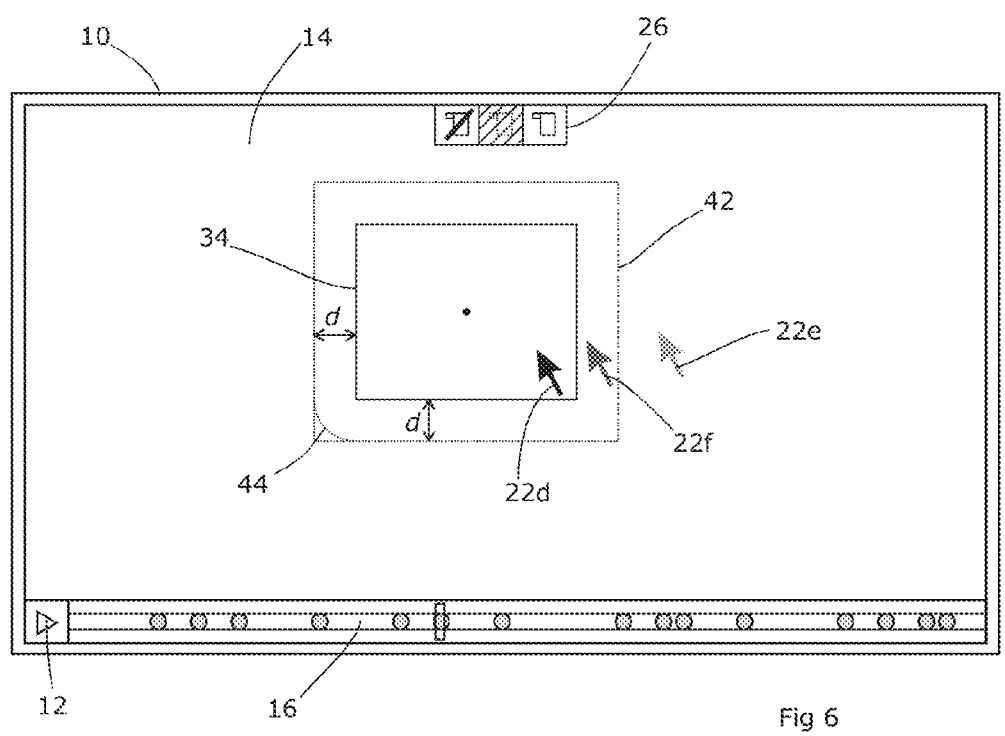

FIGS. 5 and 6 show different ways of determining whether a GUI pointer 22 is proximate to a tag 34. FIG. 5 shows a first method, being to set a predetermined distance r from a centre 38 of the tag 34. This therefore defines a circle 40 around the centre 38 and with radius r, and a GUI pointer 22a which falls within the circle 40 will be considered proximate the tag 34 whereas a GUI pointer 22b which falls outside the circle 40 will be considered not proximate the tag 34. Whilst this method works reasonably well, it does produce some anomalies if the tag is large relative to r, as shown by GUI pointer 22*c* which is actually within the tag 34 but outside the circle 40 and hence not proximate the tag 34.

FIG. 6 shows an alternative approach to determining proximity. In a first variant, it asks, simply, is the GUI pointer within the tag 34? This works well with large tags and results in the straightforward conclusion that GUI pointer 22*d* is proximate the tag 34 whereas GUI pointer 22*e* is not. A second variant allows the approach to deal well with smaller tags also, and allows the GUI pointer 22 to be deemed proximate the tag 34 if it is within a preset distance d of the outer extremity of the tag 34. Thus, a margin 42 is defined around the tag 34 and if a GUI pointer 22*f*, 22*d* which falls within that margin is considered proximate.

To simplify the calculations, the margin 42 is allowed to encompass any pixels of the video frame 14 that are within both a preset horizontal distance of the tag 34 and also within a preset vertical distance of the tag 34. This avoids the need to calculate a rounded corner 44 to the margin 42 while making little difference in practice.

Thus, the present invention allows the user to control whether tags are displayed, according to their preference and the type of video content. However, it does so in a manner that allows the user to be reactive to developments easily. It will of course be understood that many variations may be made to the above-described embodiment without departing from the scope of the present invention.

The invention claimed is:

1. A video player for tagged online video, comprising:
   a means for receiving a stream of video data and tag data, the tag data comprising details of a plurality of tags including, for each tag, a location at which to display the tag as an outline shape within the video frame during video playback;
   a video display output adapted to display;
   i. the video data,
   ii. a user-selectable tag display GUI option, and
   iii. selectively, the tag data;
   a means for receiving information as to a location of a GUI pointer relative to the displayed video output;
   wherein the video player is adapted to detect a selection of one of at least a first and a second option via the user-selectable tag display GUI option and,
   i. where the most recent selection is the first option, display tags during playback of the video data,
   ii. where the most recent selection is the second option, display tags during playback of the video data if a GUI pointer is proximate the tag location
   wherein the video player is adapted to gradually and more clearly display a tag as the GUI pointer approaches proximate the tag location together with any other tags that may be proximate the GUI pointer, and suppresses display of tags that are not proximate to the GUI pointer.

2. A video player according to claim 1 in which the tag data further comprises default tag display preference information.

3. A video player according to claim 2 adapted to use the default tag display preference information until a tag display option is selected.

4. A video player according to claim 1 in which the location information included in the tag data includes information as to the time within the video data that the tag is to be displayed.

5. A video player according to claim 1 in which the location information included in the tag data includes information as to the position within the video frame that the tag is to be displayed.

6. A video player according to claim 1, which selectively displays the user-selectable tag display GUI option when mouse pointer is proximate the location of the user-selectable tag display GUI option.

7. A video player according to claim 1, arranged to define a margin around the tag and to consider a GUI pointer to be proximate the tag location if the GUI pointer is within the margin.

8. A video player according to claim 1, arranged to consider a GUI pointer to be proximate the tag location if the GUI pointer lies within the tag location.

9. A video player according to claim 7, arranged to define a margin around the tag which encompasses any pixels of the video which are within both a preset horizontal distance and a preset vertical distance of the tag.

10. A video player according to claim 1, wherein a third option is offered via the user-selectable tag display GUI option, and, where the most recent selection is the third option, the video player is adapted to display no tags during playback of the video data.

\* \* \* \* \*